(No Model.)  2 Sheets—Sheet 1.

B. J. CURRY.
MACHINE FOR GATHERING COTTON.

No. 273,035.  Patented Feb. 27, 1883.

Attest:
F. H. Schott
A. R. Brown

Inventor:
Burwell J. Curry
per J. C. Tas. K. atty (No Model.) 2 Sheets—Sheet 2.
B. J. CURRY.
MACHINE FOR GATHERING COTTON.
No. 273,035. Patented Feb. 27, 1883.
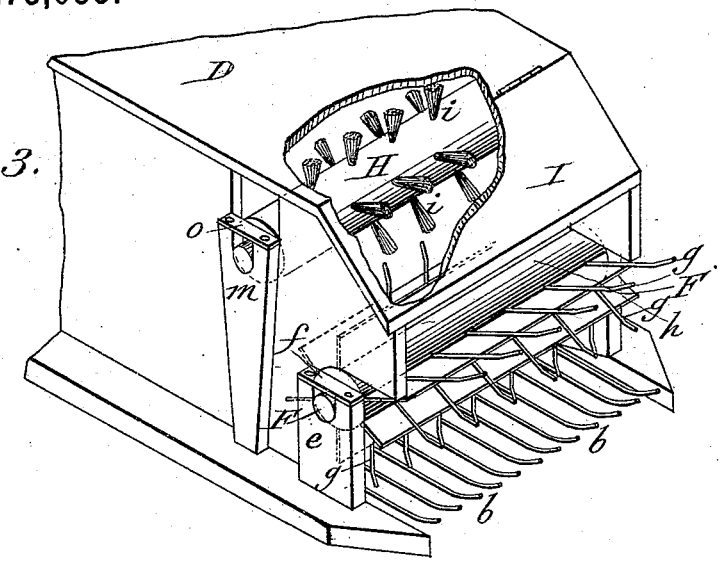
Fig. 3.
Fig. 4.
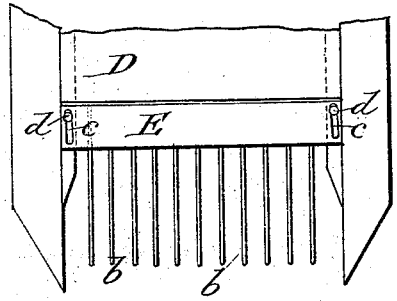
Attest.
F. H. Schott
A. R. Brown.
Inventor:
Burwell J. Curry

UNITED STATES PATENT OFFICE.

BURWELL J. CURRY, OF HUNTSVILLE, ALABAMA.

MACHINE FOR GATHERING COTTON.

SPECIFICATION forming part of Letters Patent No. 273,035, dated February 27, 1883.

Application filed November 20, 1882. (No model.)

*To all whom it may concern:*

Be it known that I, BURWELL J. CURRY, a citizen of the United States, residing at Huntsville, in the county of Madison and State of Alabama, have invented certain new and useful Improvements in Machines for Gathering Cotton; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a machine for picking or gathering cotton from the stalks or plants in the field, and also for gathering grass, clover, and other small grain or seed.

The invention consists of a box or receptacle for the gathered material, having at its forward end a stationary rake, above which is journaled a revolving rake-head, a rotary brush being arranged above and to the rear of the revolving rake-head, to assist in gathering the cotton or other material into the box. This box or receptacle is attached to the side of a suitable carriage, or may be arranged beneath the axle and between the wheels of any convenient vehicle, as hereinafter more fully set forth.

Figure 1:
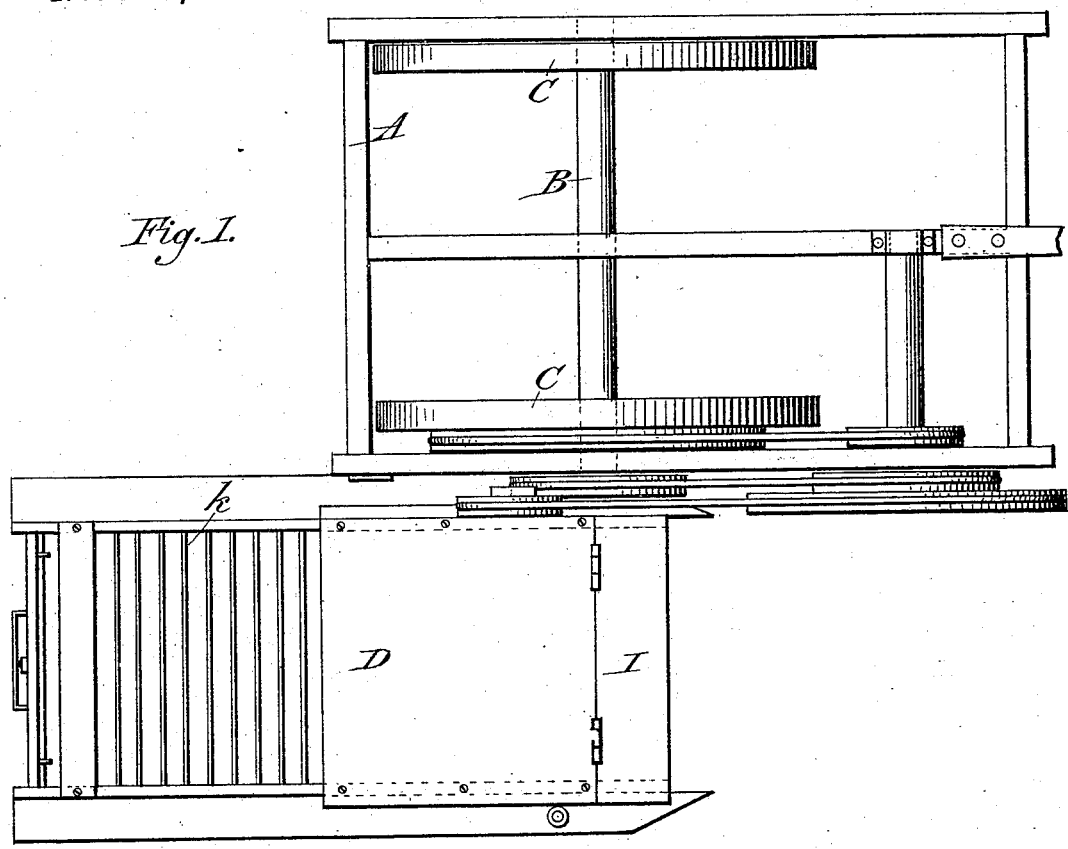
Figure 2:
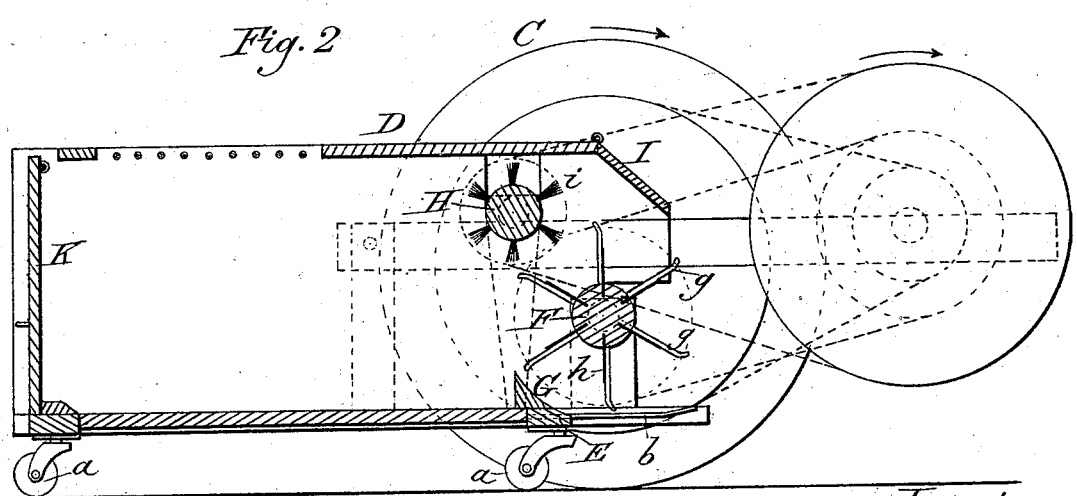

In the annexed drawings, illustrating the invention, Figure 1 is a top view of my improved machine for gathering cotton. Fig. 2 is a side elevation of the same, partly in section. Fig. 3 is a perspective view of the forward end of the box, partly broken away, and showing the gathering mechanism. Fig. 4 is a bottom view of the stationary rake, showing the means of removing or adjusting the same.

Like letters of reference are used to designate the same parts in the several views.

A represents a carriage frame or truck, having an axle, B, and wheels C C. Attached to the side of this carriage-frame, as shown in Fig. 1, or supported beneath the axle B in any suitable manner, is a box or receptacle, D, for receiving the gathered material. This box or receptacle is preferably oblong and rectangular in form, and may be provided with rollers $a\ a$, that afford an additional support thereto. The lower portion of the forward end of the box D is open, as shown in Figs. 2 and 3, and is provided with a stationary rake-head, E, that is provided with forward-projecting teeth composed of steel rods or tines $b\ b$. These tines or teeth are arranged at suitable distances apart, and are adapted to hold up the stalks or stems of the plants to the action of a rotary rake, F, that is journaled within the mouth of the box a short distance above the stationary rake. The stationary rake-head E is provided with slots $c\ c$ at each end, through which are passed set screws or bolts $d\ d$, by which said rake-head is rendered removable and adjustable, so that it may be readily replaced by one in which the tines $b\ b$ are set closer together or farther apart, according to the varying requirements of the material or product to be gathered. This construction also enables the stationary rake to be adjusted forward or back, as may be required. The head or cylinder F, composing the shaft of the rotary rake, is journaled in bearings $e$, as shown in Fig. 3, and may be readily removed by detaching the straps or plates $f$, so that this rake may also be changed for one in which the teeth or tines $g\ g$ are arranged at a greater or less distance apart to correspond with the coarseness or fineness of the stationary rake, as before described. The teeth or tines $g\ g$ of the rotary rake are composed of steel rods, that may be either straight or curved. These tines $g$ are inserted into the head or cylinder F in any suitable manner, so as to alternate with the tines $b$ of the stationary rake, and are placed in contact with metallic strips or blades $h\ h$, that are also attached to the cylinder F, and act as fans to assist in passing the gathered material into the box D.

Attached to the bottom of the box D below and slightly to the rear of the rotary rake F, is a concave, G, over which the gathered material is forced by the action of the combined rotary rake and fans. A rotary brush, H, composed of a shaft having attached thereto a series of steel wires or stiff bristles, $i\ i$, is journaled above and to the rear of the rotary rake F, so as to brush off any material adhering to the tines $g\ g$, thus causing such material to fall back into the box; and the shaft of this rotary brush may also be provided with fan-blades, similar to those on the rotary rake-head. The upward and forward portion of the box D, in front of the rotary brush, is provided with an inclined door or lid, I, that is hinged to the box, as shown in Figs. 2 and 3, a door, K, being also provided at the rear end of the box, through which the box may be emptied when desired. The upper rear portion of the box is slotted or provided with suitable openings, or may have a large opening that is partly closed by the transverse rods or bars $k\,k$, as shown in Figs. 1 and 2, the object being to provide means for a full draft through the box. It will be observed that the rotary brush H is journaled in bearings $m\,o$, as shown in Fig. 3, so as to be removable when desired.

The operation of the machine will be readily understood. The machine is drawn by animal power along the cotton-rows in such a manner as to cause the stationary rake E to hold the stalks to the action of the rotary rake F, which gathers the cotton and passes it over the concave G into the box D, the teeth of the rotary rake, during their upward movement in the mouth of the box, being cleansed or stripped by means of the steel wires $i\,i$ of the rotary brush H, the entire bulk of the gathered material being thus deposited in the box. This result is facilitated by means of the fan-blades attached to the shaft of the rotary rake, similar fans being also attached to the shaft of the rotary brush. The gathered material is thus forced back into the box, while the draft carries off the dust and chaff through the perforations or openings in the top of the box. When the box is filled the gathered material is removed through the door K, and may be hauled to the gin-house or other place of deposit. In gathering clover, grass, or other small grain or seed, the rakes E and F will be changed for others of like construction, but having teeth or tines placed closer together. The rotary brush H and rotary rake F, as represented in the drawings, are driven by a series of belts and pulleys that are actuated from one of the driving-wheels C; but it is obvious that any suitable operating mechanism may be employed for a like purpose.

Having thus described my invention, what I claim as new, and desire to secure by Letters Patent, is—

1. The combination, with the slotted or perforated box D, having concave G, of the stationary but adjustable rake E, rotary rake F, having tines $g$ and fan-blades $h$, and the rotary brush H, substantially as described.

2. The combination, with the slotted or perforated box D, having concave G and doors I and K, of the stationary but adjustable rake E, rotary rake F, rotary brush H, and suitable operating mechanism, substantially as described.

BURWELL J. CURRY.

Witnesses:
J. VAN VALKENBURG,
J. R. JONES.